Aug. 11, 1970  D. L. BEAMAN  3,523,722

FILM SPEED CONTROL APPARATUS

Filed March 15, 1967  4 Sheets-Sheet 1

INVENTOR.
DON L. BEAMAN
BY
Schapp & Hatch
ATTORNEYS

Aug. 11, 1970            D. L. BEAMAN            3,523,722

FILM SPEED CONTROL APPARATUS

Filed March 15, 1967            4 Sheets-Sheet 3

INVENTOR.
DON L. BEAMAN
BY
Schapp & Hatch
ATTORNEYS

United States Patent Office 3,523,722
Patented Aug. 11, 1970

3,523,722
FILM SPEED CONTROL APPARATUS
Don L. Beaman, Sunnyvale, Calif., assignor to Red Lake Laboratories, Santa Clara, Calif., a corporation of California
Filed Mar. 15, 1967, Ser. No. 623,377
Int. Cl. G03b 39/00, 41/08, 31/02
U.S. Cl. 352—84                                    13 Claims

ABSTRACT OF THE DISCLOSURE

A high speed motion picture camera of the continuous motion type having an electronic speed control having a feedback circuit responding to the camera speed to control the supply of current to the camera motor, and having also manual control of the current supply to the camera motor, independent of the speed of the camera. A sprocket engages the film twice, once before and once after the film passes through the gate of the camera, and spring loaded idlers press on the film between the supply spool and the sprocket and between the sprocket and the takeup spool to absorb transient unwanted modulations in the film speed.

BACKGROUND OF THE INVENTION

This invention relates to Film Speed Control Apparatus for high speed motion picture cameras, and more particularly to apparatus for accurately controlling the camera speed and preventing fluctuations in film supply speed and film takeup speed from affecting the speed of film movement through the gate of the camera.

The speed control of the present invention is adaptable for control of a wide variety of motion picture cameras, but it is particularly useful in connection with high speed motion picture cameras of the continuous motion type, such as the camera disclosed in U.S. Pat. No. 3,259,448, issued July 5, 1966, to Ernest M. Whitley et al.

In some prior art cameras, the film is pulled through the camera by connecting the motor to the spindle supporting the takeup spool, and the camera speed is controlled by connecting a variable transformer of the Variac or Powerstat type in the power supply line to the motor. Such variable transformers are heavy and awkward, and they do not match the current supply to the camera motor to the speed of the motor, affecting the precision and efficiency of control.

Furthermore, in cameras of this type, variations in the film drive speed and film supply speed are necessarily transmitted to and to some extent affect the speed of the film as it passes through the gate of the camera, despite the inertial load imposed upon the film by the prism drive sprocket. A centrifugal clutch is imposed between the motor and the film takeup spool in the Whitley et al. camera, and a drag device restrains the supply spool to prevent overrunning. Minor variations in the frictional engagement of these clutches, eccentricity of the film supply and takeup spools, and other mechanical and electrical variations in the system, were reflected in jerking and oscillation of the image as projected, due at least in part to stretching of the film and warping of the sprocket holes on the teeth of the prism drive sprocket.

SUMMARY OF THE INVENTION

The film speed control apparatus of the present invention controls the speed at which the film is driven by a feedback electronic circuit which measures the actual speed of the camera and adjusts the amount of current supplied to the motor in accordance with the difference between that speed and the desired speed. This circuit operates with light weight, reliable solid state electronic components and is small enough to be built into the housing of the camera apparatus for the greatest convenience of transport. The feedback nature of the speed control circuit makes it possible for the circuit to detect and correct variations in motor speed, and renders the apparatus independent of variations in the line voltage, thus isolating the film strip from speed varying effects of transcient changes in current supply. At the same time, the flexibility of full manual contol offered by the variable transformer is retained for those occasions in which manual control is desired, independent of the actual speed of the camera.

The electronic speed control circuit generates a sequence of pulses at a repetition frequency proportional to the actual speed of the camera. These pulses are used to generate a signal level likewise proportional to actual camera speed, which is then compared to an adjustable signal level proportional to the desired camera speed. The difference between these two signals is then used to generate a second series of pulses synchronized with half cycles of the A.C. line frequency and whose duration is proportional to the difference between the two signals or the error in speed of the camera. This synchronized series of pulses is then used to gate a silicon controlled rectifier circuit controlling the passage of alternating current from the supply line to the camera motor, so that the silicon controlled rectifier circuit passes current to the motor for a controlled portion of each cycle of the A.C. line frequency. Full manual control is provided by disconnecting the signal proportional to actual camera speed and controlling the duration of the synchronized pulses directly by the adjustable signal level proportional to the desired camera speed.

Variations in film takeup speed and the speed and smoothness of supply of the film to the gate are eliminated in the film speed control apparatus of the present invention by mechanically decoupling the portion of the film passing through the gate from the portions of film leading from the supply spool and to the takeup spool. Two types of devices provide the necessary mechanical decoupling and isolation. The first of these is a sprocket which engages the film twice, once before the film passes through the gate and past the prism drive sprocket, and once after. The loop of film from this sprocket, through the gate and back to this sprocket is thus isolated from the influences of the film supply and takeup spools. The path of this loop is substantially equal to an integral multiple of the sprocket hole spacing in the film, so that no slack exists in the loop to make it sensitive to jerking motion in either the takeup or supply systems.

The second type of decoupling device used is an idler roller, spring-pressed toward the film passing it, to absorb and damp out some of the uneven motion of the film in a controlled manner. Two of these spring decouplers are used, one between the supply spool and the doubly engaging sprocket and the other between that sprocket and the takeup spool along the film path. Between the spring-loaded idler decouplers and the doubly engaging sprocket decoupler, an excellent degree of steadiness of the image location on the film is obtained. An alternative film path through the camera is provided so that the film may be threaded without engaging the decoupler sprocket, as the presence of its added inertia may be a disadvantage when running the camera at ultra high speeds. On this alternate path, the spring-loaded decoupler rollers alone provide the necessary isolation.

Accordingly, it is a principal object of the present invention to provide a film speed control of the character described in which the film passing through the gate of the camera is decoupled from influences tending to cause transient and unwanted changes in speed.

It is a further object of the present invention to provide a film speed control of the character described which will rapidly and accurately sense the speed of the camera and automatically regulate the speed by controlling the duration of current flow to the camera motor.

Another object of the present invention is to provide a film speed control of the character described which will provide increased steadiness of image position on the film.

A further object of the present invention is to provide a film speed control apparatus of the character described in which the portion of the film passing through the gate of the camera is formed as a tensioned loop isolated from intermittent forces such as jerking, vibrating, sticking and slipping in the supply and takeup spools.

Still another object of the present invention is to provide a film speed control apparatus of the character described which will permit selection of manual control of the current supply to the motor irrespective of camera speed.

A still further object of the present invention is to provide a film speed control apparatus of the character described of increased compactness, reliability and convenience of operation and reduced sensitivity to supply voltage variations.

Further objects and advantages of the invention will be apparent as the specification progresses, and the new and useful features of the present film speed control apparatus will be more fully defined in the claims attached hereto.

BRIEF DESCRIPTION OF THE DRAWINGS

The preferred form of the invention is illustrated in the accompanying drawings forming part of this specification, in which.

While only the preferred forms of the invention are shown, it should be understood that various changes or modifications may be made within the scope of the claims attached hereto without departing from the spirit of the invention.

DESCRIPTION OF THE PREFERRED EMBODIMENTS

Figure 1:
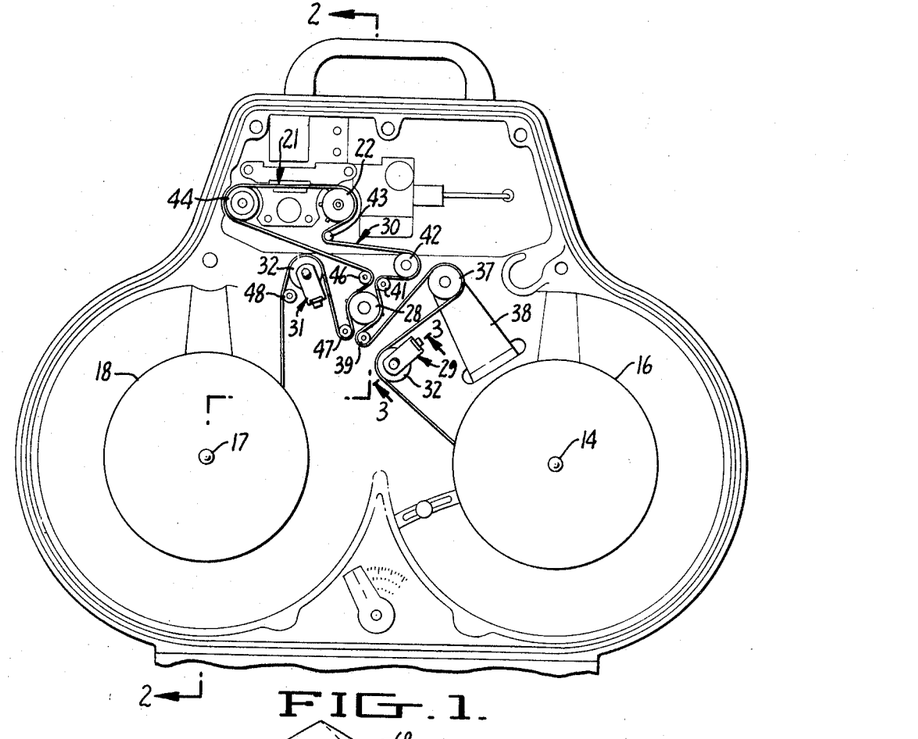
FIG. 1 is a rear elevation view, with the rear door removed, of a high speed motion picture camera showing the mechanical decoupling devices of the film speed control apparatus of the present invention installed thereon.

Referring to the drawings in detail, it will be seen that the film speed control apparatus of the present invention provides decoupler means and is adapted for use in a high speed motion picture camera 11, having a housing 12, and a film drive means 13 for passing a strip of perforated motion picture film through the camera. The film drive means includes a feed spindle 14 for supporting a feed spool 16 carrying a supply of motion picture film, a takeup spindle 17 supporting a takeup spool 18, and an electric motor 19 which rotates the takeup spindle 17. A film gate 21 is mounted in the housing 12 and supports the film strip in a substantially flat plane.

A film engaging sprocket 22 is journaled in the housing 12 adjacent to the film gate 21 and is formed with teeth to engage the perforations in the strip of motion picture film moving through the film gate 21. The moving film thus rotates the sprocket 22 around its axis. A multiple facet motion compensating prism 23 is connected to the film engaging sprocket 22 so that the prism and sprocket rotate together about the same axis.

Figure 10:
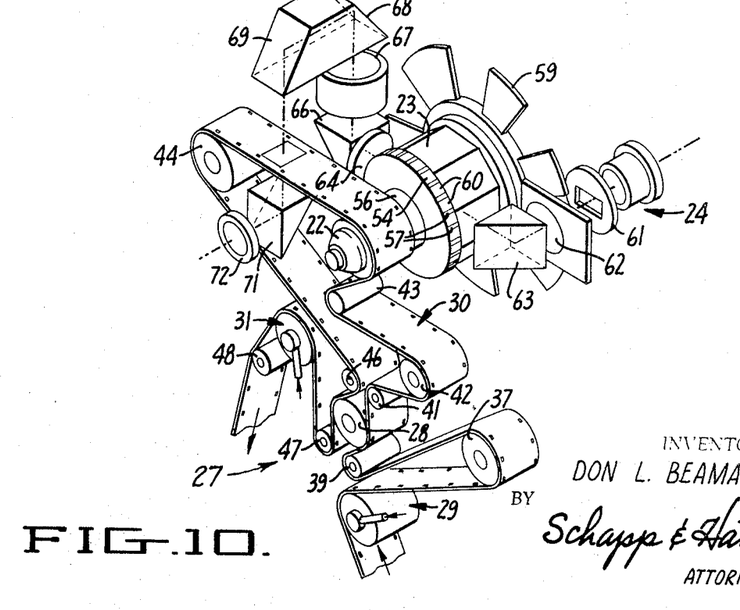
FIG. 10 is an enlarged diagrammatic view of the principal optical components of the camera of FIG. 1.

The camera also includes an objective lens system 24 mounted in the housing 12 and an image transfer system 26 made up of a system of reflective surfaces and field lenses supported in positions within the housing 12 around the prism 23. The image transfer system 26 intercepts the beam of light entering the camera through the objective lens system 24 and directs that beam through the prism 23 and onto the motion picture film in the film gate 21, as shown in the Whitley et al. patent cited above.

In accordance with the present invention, the decoupling means includes decoupling apparatus 27 operatively connected to the film drive means 13 to decouple that part of the strip of motion picture film passing through the film gate 21 from influences tending to vary the speed of its movement from a selected rate. The decoupling apparatus 27 is provided in three different forms, and the different forms or devices may be used separately, when desired, or used in cooperative combination for the maximum speed stabilizing effect.

One of these decoupling devices is a toothed decoupler sprocket 28 journaled in the housing 12 and engaging the motion picture film at two points along the path of the film between the film supply spool 16 and the film takeup spool 18. One point of engagement of the film with the toothed decoupler sprocket 28 lies between the film supply spool 16 and the film gate 21, and the other point of engagement lies between the film gate 21 and the film takeup spool 18. The toothed decoupler sprocket 28 need not be driven by any source of power, but may be rotated by the action of the film being pulled past it, in the fashion that the film engaging sprocket 22 is rotated. The toothed decoupler sprocket 28 may, if desired, be partially restrained against rotation by a slipping clutch, drag or brake apparatus of any suitable design or it may be, as shown in the preferred embodiment herein, entirely freewheeling, that is, not operatively engaged with anything except the strip of motion picture film.

The essence of the decoupling action of the sprocket 28 appears to lie in its engagement of the strip of film both before and after the strip of film passes through the film gate 21, as it in effect forms an isolated loop 30 of film between the two points at which it engages the film. The engagement of the toothed decoupler sprocket 28 with the film leaving the supply spool 16 and the film moving toward the takeup spool 18 allows any disturbances in the smooth motion of either the supply spool 16 or the takeup spool 18 to be opposed by the inertia of the undisturbed spool without having to transmit the force of the disturbance through that portion of the film which is moving at a desired continuous rate of speed through the film gate 21.

The toothed decoupler sprocket 28 also stabilizes the speed of movement of the film by providing additional sprocket teeth engaging the perforations in the strip of film, besides those on sprocket 22, for opposing stretching of the film strip and the tendency of the perforations to warp and bend about the sprocket teeth when under extreme strain. The adding of the mechanical inertia of the sprocket 28 to the system by coupling the film strip to the sprocket also serves to dampen irregularities in film movement.

To further enhance the isolation of the loop 30 of film, the path of the loop from the decoupler sprocket 28 past the film engaging sprocket 22 through the film gate 21 and back to the toothed decoupler sprocket 28 is made a substantially integral multiple of the spacing of the perforations in the strip of film, so that the loop of film may be held under constant tension over this path without any slack. Holding the loop 30 under tension contributes to the stability of its speed of movement through the film gate 21 by not allowing such slack in the loop as would allow variations in speed of movement to take place.

Another of the decoupling devices of the present invention takes the form of decouplers which resiliently apply a component of force against the surface of the film strip generally perpendicular to the direction of movement of the film at points located along the film path between the supply spool 16 and the gate 21 and between the gate 21 and the takeup spool 18. Any unwanted modulations in the speed of movement of the film strip, such as those caused by jerking or sticking of either the supply spool 16 or the takeup spool 18 or variations in motor speed, are transmitted along the film strip as variations in the tension imposed upon it. This is because the film strip is pulled through the camera by the electric motor 19 attached to the takeup spindle 17. These jerking or sticking variations in tension are compensated for by one or the other of the decoupling devices 29 and 31. When the changes in tension reach the decoupler devices 29 or 31, they are opposed by a component of force applied perpendicular to the surface of the film strip and are thereby mechanically filtered out.

Figures 2, 3, 4:
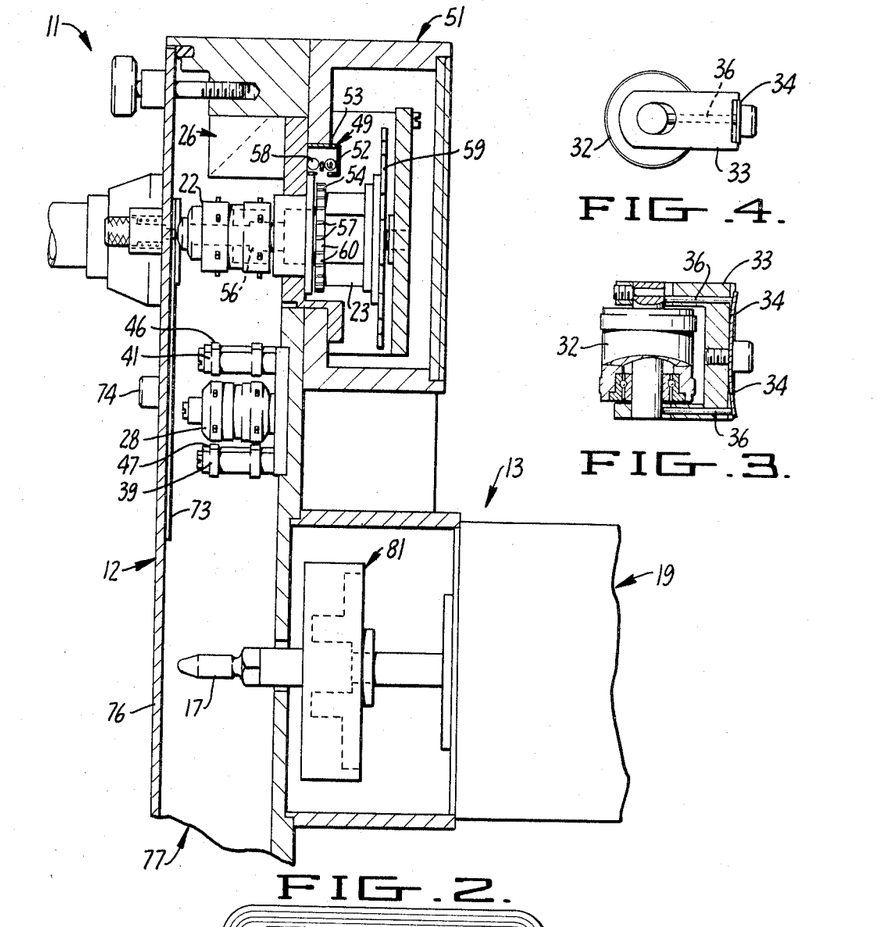
FIG. 2 is a cross-sectional view taken substantially along the plane of lines 1—1 of FIG. 1.
FIG. 3 is an enlarged side elevational view of one of the decoupler rollers of the present invention.
FIG. 4 is an enlarged top view of one of the decoupler rollers of the present invention.

As shown in FIGS. 3 and 4, the decoupler devices 29 and 31 each comprises an idler roller 32 journaled for rotation in a bracket 33 mounted in the housing 12. To provide the described component of force against the film strip, a spring 34 is attached to the bracket 33 and presses against pins 36 journaled for axial movement in the arms of the bracket 33. The pins 36 in turn press against the axle of the idler roller 32 to urge it against the strip of film.

When the strip of film is led past the decoupler devices 29 or 31 in threading the camera, it is pulled slightly against the decoupler devices moving the idler roller 32 toward the spring 34, biasing the spring. The film is not pulled tight enough, however, to push the idler roller 32 initially to the full limit of its travel so that the idler roller may move toward and away from the spring 34 to ease tension or to take up slack in response to jerks and variations in the speed of film movement and in tension in the film. While the decoupler devices 29, 31 are here illustrated as spring loaded idler rollers, it may be sean that other means of resiliently applying a force against the surface of the film, such as spring loaded pressure plates, could likewise be used.

The decoupler devices 29 and 31 operate together with the toothed decoupler sprocket 28 to regulate the speed and tension of the film as the decoupler devices 29 and 31 absorb a large part of the variation before the film passes onto the toothed decoupler sprocket 28. The toothed decoupler sprocket then operates to further smooth and dampen variations in the forces applied to the film.

It is advantageous at the highest speeds of the camera to minimize the inertia of the moving parts which must be driven by the strip of film passing them. For this reason, the path of the film through the camera has been so arranged that the film may be threaded to avoid engagement with the toothed decoupler sprocket 28 and thereby reduce the inertia of rotating parts in the system, if desired.

In FIG. 1 of the drawings, the film is shown threaded along a path which includes both the devices 29 and 31 and the toothed decoupler sprocket 28. This path proceeds from the film supply spool 16 around the idler roller 32 of decoupling devices 29, around an idler roller 37 attached to an arm 38, and from there around the first of a pair of guide rollers 39 and 41 which force the strip of film to conform to a portion of the circumference of toothed decoupler sprocket 28 so that the film engages the teeth of that sprocket. The film engages the toothed decoupler sprocket 28, passes around the other of the guide rollers 41, past an idler roller 42 and a guide roller 43 which guides the film into engagement with a portion of the circumference of the film engaging sprocket 22. The strip of film then passes through the film gate 21, around an idler roller 44 and a pair of guide rollers 46 and 47 similar to guide rollers 39 and 41, which force the film into engagement with another portion of the circumference of toothed decoupler sprocket 28. The strip of film engages toothed decoupler sprocket 28 for the second time, passes by the second member of the pair of the guide rollers 46 and 47, around the idler roller 32 of the second of the decoupler devices 31, past a small guide roller 48 and onto the takeup spool 18.

Figure 5:
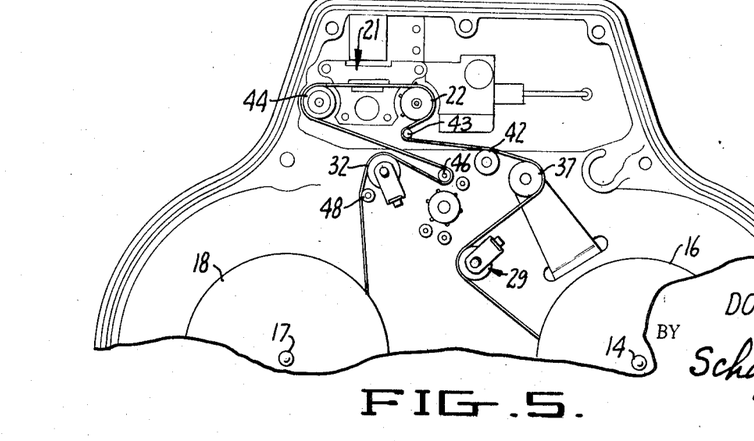
FIG. 5 is a rear elevational view corresponding to FIG. 1 showing an alternate film threading path.

In the mode of threading which avoids engagement with the toothed decoupler sprocket 28 as shown in FIG. 5, the film passes from the supply spool 16 past the decoupler devices 29 and idler roller 37, and from there directly past idler roller 42 and guide roller 43 to the film engaging sprocket 22. The film then passes through the film gate 21, around idler roller 44, and to the first of the pair of guide rollers 46. Instead of passing on around a portion of the circumference of toothed decoupler sprocket 28, however, the film passes directly from guide roller 46 to decoupler means 31, around the small guide roller 48 and to the takeup spool 18. In this mode of threading of the camera, all of the mechanical isolation and decoupling is provided by the decoupler devices 29 and 31.

Figure 7:
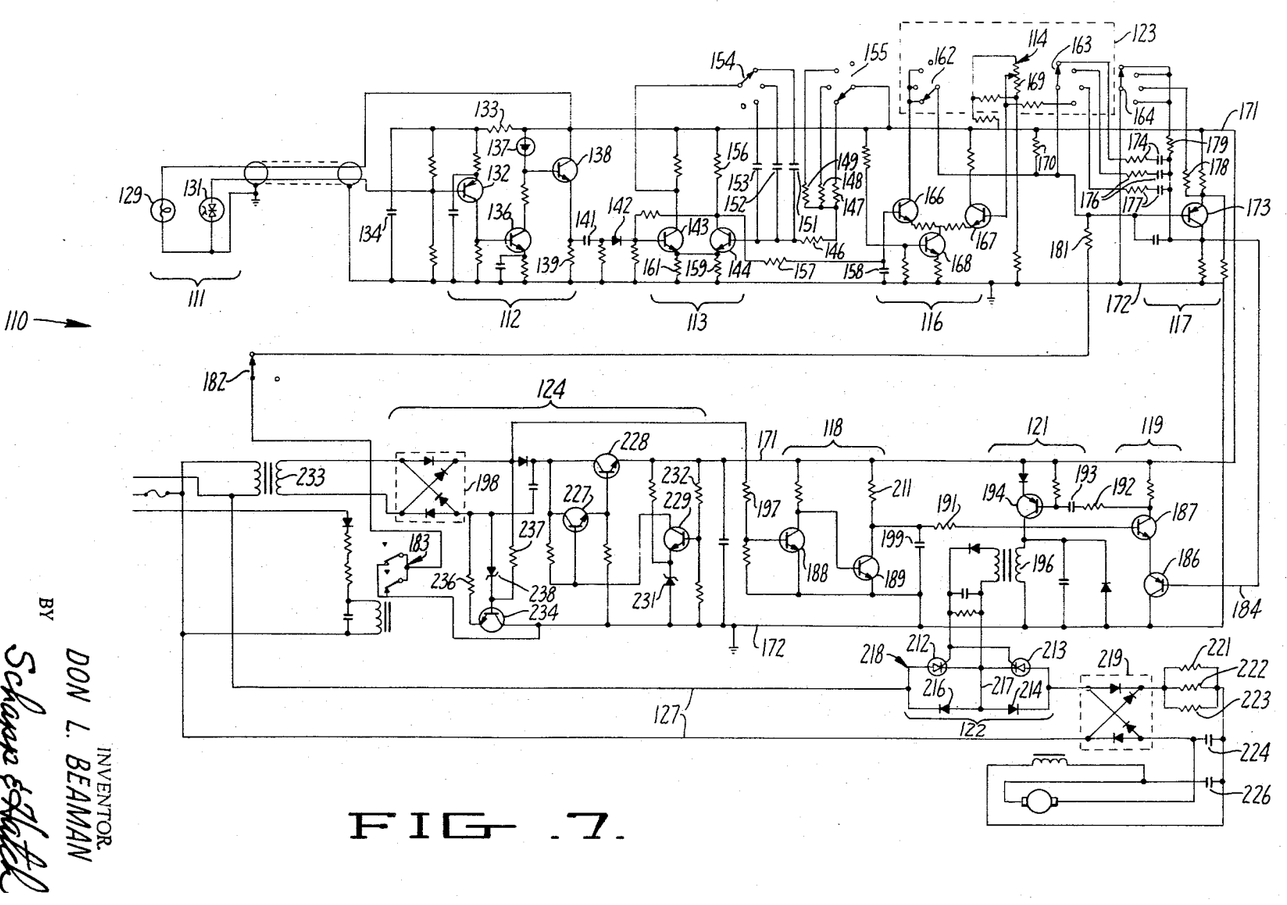
FIG. 7 is a schematic diagram of the electronic circuit of the film speed control of the present invention.

The third portion of the decoupling means of the present invention comprises an electronic speed control circuit 110 governing the duration of the supply of current from an alternating current supply line 127 to the electric motor 19 which drives the takeup spindle 17 to operate the camera. The electronic speed control decoupling device senses the actual speed of movement of the film through the camera by means of a speed sensor 49 best seen in FIG. 2 mounted in the optical head portion 51 of the camera 11. The speed sensor 49 includes light source 52 mounted in a housing 53 and illuminating an enlarged portion 54 of a shaft 56 journaled in the optical head portion 51. The light source 52 may be of any appropriate type, but as here shown, it is a small, incandescent lamp 129 powered by direct current as shown in FIG. 7. The shaft 56 carries the film engaging sprocket 22, the multiple facet motion compensation prism 23, and may also carry a rotary segmented disc-type shutter 59 as disclosed in the Whitley et al. patent cited above. A series of alternating reflective and nonreflective areas 57 and 60 respectively are painted on the enlarged portion 54 and illuminated by the light source 52. A light sensitive element 58 is exposed to the light reflected from reflective areas 57 to produce a series of current pulses as the reflective areas 57 are rotated past the speed sensor 49. The light sensitive element 58 may be any appropriate photosensitive device, but as here shown is a photodiode 131 as described below in connection with the electronic speed control circuit.

As may be seen from FIG. 10, light enters the camera 11 through the objective lens 24. The light then passes a framing and fiducial line mask 61 and through a field lens 62 to the first of a series of reflective surfaces 63, 66, 68, and 69 which are part of the image transfer system 26. Reflective surface 63 reflects the light through the prism 23 and on through a second field lens 64 to another reflective surface 66. The light continues through a re-imaging lens 67 and onto another reflective surface 68. From there, the light is reflected to another reflective surface 69, which directs the light onto the film in the gate 21.

The image may be viewed by the operator for focusing and alignment through an eyepiece lens system 72 which receives the image from the back side of the film as reflected by a reflective surface 71. A shutter 73 allows this light path to be interrupted when the eyepiece is not in use, to prevent fogging of the film. The shutter 73 is mounted in the rear door 76 of the camera and operated by a button 74.

Figure 8:
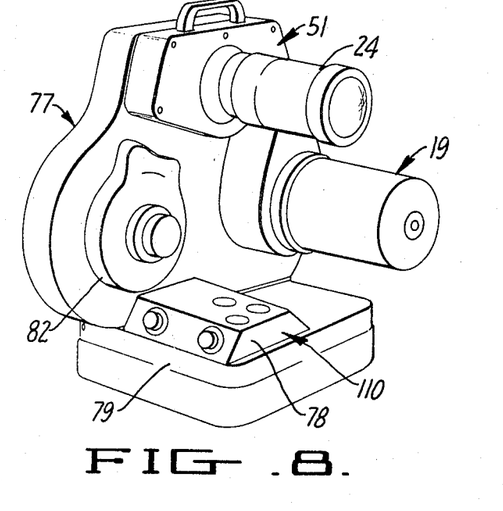
FIG. 8 is a perspective of the camera of FIG. 1.
Figure 9:
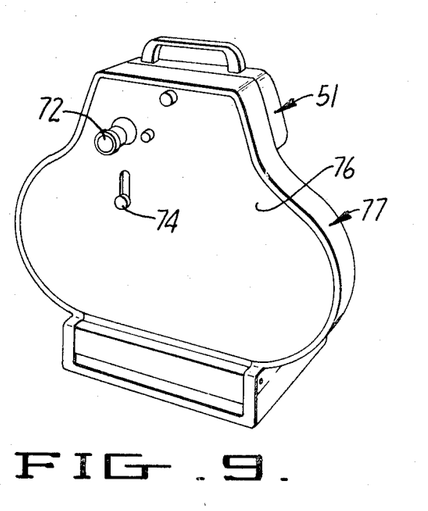
FIG. 9 is a rear perspective view of the camera of FIG. 1.

The housing 12 of the camera includes the optical head portion 51, a film magazine and drive portion 77 and the enclosure 78 for the electronic speed control circuit 110. The film magazine and drive portion 77 and the speed control enclosure 78 are mounted on a base plate 79. The optical head portion 51 and the enclosure 78 of the speed control are readily demountable from the remainder of the camera for flexibility in use.

For smoothness of starting, a centrifugal clutch 81 may be interposed between the motor 19 and the takeup spindle 17 to allow some slippage while the motor is getting up to speed. The clutch 81 engages more firmly the faster it is rotated. A drag device 82 may be attached to the feed spindle 14 to prevent its overrunning.

Figure 6:
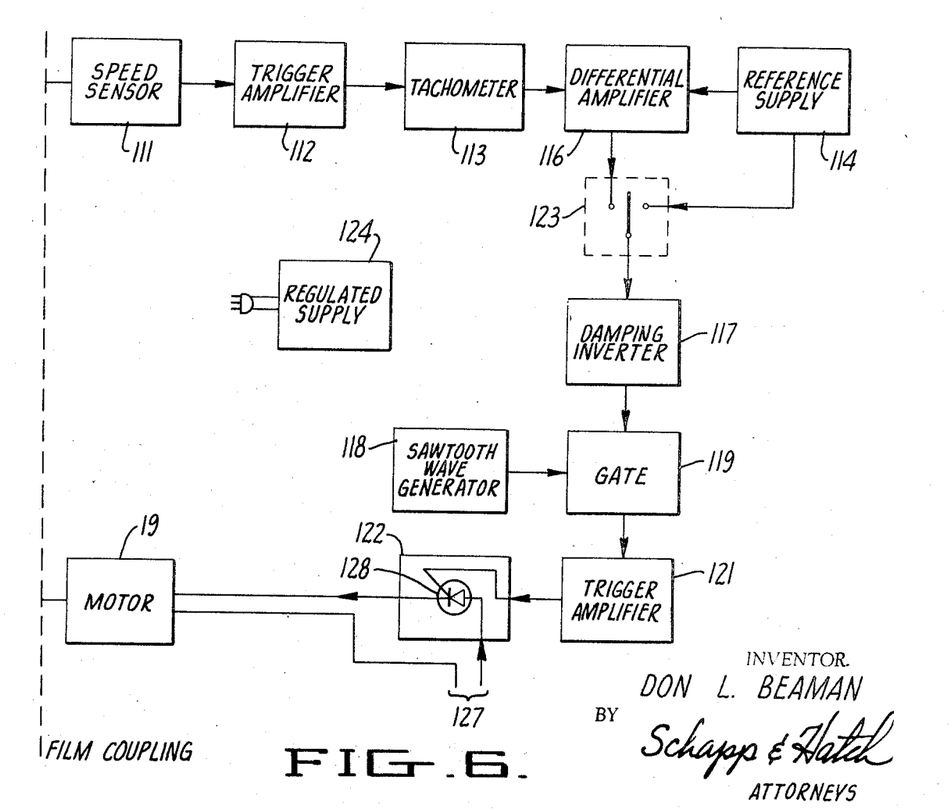
FIG. 6 is a block diagram of the electronic circuit of the film speed control of the present invention.

Referring now to FIG. 6, the block diagram shows the electronic speed control circuit 110 of the present invention and includes a speed sensor circuit 111 responsive to the operation of motor 19 to produce a series of pulses whose repetition frequency varies in proportion with the speed of the motor. The pulses from the speed sensor circuit 111 are passed through a first trigger amplifier circuit 112 to a tachometer circuit 113.

The tachometer circuit 113 responds to the pulses amplified and shaped in the trigger amplifier circuit 112 to produce a direct current signal level proportional to the repetition frequency of the pulses, and this direct current signal level is communicated to one input of a differential amplifier circuit 116. A reference supply source 114 furnishes a manually adjustable DC signal level which is communicated to the other input of the differential amplifier 116. The differential amplifier circuit 116 responds to these two DC signal levels to produce an error signal proportional to their difference, and this error signal is then fed to a damping and inverting circuit 117.

In damping and inverting circuit 117, the error signal is smoothed to match the electrical response time of the electronic speed control circuit 110 to the mechanical response time of the motor 19 and camera 11 and to prevent overshoot and oscillation in the speed control circuit. The damped and inverted error signal is then fed to one input terminal of a gate circuit 119. A sawtooth wave generator circuit 118 produces a sawtooth wave in synchronism with each half cycle of the alternating current supplied to the camera 11, and this sawtooth wave is supplied to the other input of gate circuit 119.

The gate circuit 119 responds to the error signal from damping and inverting circuit 117 and the sawtooth wave from sawtooth wave generating circuit 118 to produce an output signal during the time the amplitude of the sawtooth wave exceeds the level of the error signal. This output signal is communicated to a second trigger amplifier circuit 121 which appropriately amplifies, shapes, and conditions the output for supply to a motor current control circuit 122.

The motor current control circuit 122 is interposed in the alternating current supply line 127 to the motor 19 and includes a silicon controlled rectifier 128 connected in one side of supply line 127. The gate terminal of the silicon controlled rectifier 128 is coupled through the trigger amplifier 121 to the output of the gate 119 to allow the output of gate 119 to activate the silicon controller rectifier 128 to pass current to the motor 19.

A switch means 123 is interposed between differential amplifier 116, reference supply source 114, and damping and inverting circuit 117 to make possible a change in the path of interconnections among these three circuits, so that the error signal output of differential amplifier circuit 116 may be disconnected from gate circuit 119, and the manually adjustable direct current signal from reference supply source 114 may be connected to the gate circuit 119 in its place. Switch means 123 thus permits a manually adjustable signal to be supplied to the gate terminal of the silicon controlled rectifier 128 independent of the speed of the motor 19 when reference supply source 114 is connected directly to damping and inverting circuit 117 and gate circuit 119 in place of the differential amplifier output.

Referring now to FIG. 7, the complete schematic of the electronic speed control circuit, the speed sensor circuit 111 includes a small incandescent light bulb 129 and a photodiode 131 which is responsive to reflection of light from light bulb 129 by reflective areas painted on the enlarged portion 54 of the shaft 56.

The pulses from the photodiode 131 are transmitted to the first trigger amplifier 112 where they are communicated to the base of a transistor 132. Transistor 132 is decoupled from any noise or ripple appearing at the output of the regulated power supply 124 by a resistor 133 and a capacitor 134. Transistor 132 amplifies the signal received from photodiode 131 and supplies it to a transistor 136. Transistor 136 provides a current to a tunnel diode 137 which in turn provides an extremely fast-rising switch pulse, which operates a transistor 138 from cutoff condition to saturation condition, creating an output trigger voltage in the form of a shaped and amplified pulse across a resistor 139.

These shaped and amplifier pulses developed across the resistor 139 are communicated to the tachometer circuit 113 through a capacitor 141 and a diode 142, where they are applied to the base of a transistor 143. Transistor 143 is connected in feedback or multivibrator relation with a transistor 144. The bias conditions on transistor 143 are such that in the absence of an input signal through capacitor 141 and diode 142, transistor 143 is normally non-conducting and transistor 144 is normally conducting, or saturated.

When a pulse is received at the base terminal of transistor 143, that transistor momentarily becomes conducting, causing transistor 144 through the feedback connection to become non-conducting. Transistor 144 remains non-conducting for a length of time determined by the resistor-capacitor time constant of the combination of resistor 146, the one of the resistors 147, 148, and 149 selected by a switch 155, and the one of the capacitors 151, 152, and 153 selected by a switch 154. During the time transistor 144 is non-conducting, a capacitor 158 is allowed to charge through resistors 156 and 157.

When transistor 144 returns to its conducting or saturated state upon the decay of the charge of one of capacitors 151, 152, and 153 through resistor 146 and one of resistors 147, 148, and 149, transistor 143 is driven into a non-conducting state through the feedback connection between transistors 144 and 143. Also, as transistor 144 resumes conduction in its saturated state, the charge built up across the capacitor 158 is drained off through resistor 157, transistor 144, and the emitter resistors 159 and 161 of transistor 144 and 143 respectively.

The voltage across capacitor 158 is determined by the number of pulses per second put into the tachometer circuit at the base of transistor 143, as the greater the number of pulses per second put into the tachometer circuit, the smaller will be the proportion of the time in which transistor 144 is conducting to discharge capacitor 158 through resistor 157, transistor 144, and emitter resistors 159 and 161. The selection possible among resistors 147, 148, and 149 and capacitors 151, 152, and 153 permits decade range selection of the sensitivity of tachometer circuit 113, so that the range of voltage developed across capacitor 158 is the same in three different ranges of speed developed in the camera 11.

The voltage developed across capacitor 158 is the input to the differential amplifier circuit 116. This circuit includes a pair of transistors 166 and 167 connected as a conventional differential amplifier to a transistor 168 which serves as a constant current source and provides common mode rejection. Transistor 168 supplies current to either transistor 166 or transistor 167 or both, depending on the voltage levels at their bases. The voltage level at the base of transistor 166 is determined by the voltage across capacitor 158 and the voltage level at the base of transistor 167 is determined by the output of the reference supply source 114.

The reference supply source 114 includes a potentiometer 169 connected between the DC positive supply line 171 and the DC negative supply line 172. The movable contact of the potentiometer 169 is connected to the base of transistor 167 to supply a variable voltage to that base characteristic of the position of the variable contact of the potentiometer 169. Potentiometer 169 is manually adjustable and represents the control which selects the desired speed of the camera. As the input to the base of the transistor 167 is thus proportional to the desired speed of the camera and the input to the base of transistor 166 is proportional to the voltage across the capacitor 158 which represents the actual speed of the camera, it can be seen that the output of the differential amplifier 116 is proportional to the difference between the desired and actual speeds of the camera, or in other words the error in speed of the camera. For this reason, the output of differential amplifier circuit 116 is referred to as the error signal.

The error signal is represented by the voltage developed across the collector resistor 170 of transistor 166, and it is communicated to the base of a PNP-type transistor 173 which forms a part of the damping and inverting circuit 117. A switch 162 connects the collector of transistor 166 to resistor 170 and the base of transistor 173 in the first three positions of its clockwise motion and disconnects it in the fourth position. A switch 163 selects one of resistor-capacitor pairs 174, 176, or 177 for connection between the collector and the base of transistor 173 for damping the response of the transistor to the input error signal at its base. In its fourth or most clock-wise position, switch 163 couples damping and inverting circuit 117 directly to the reference supply source 114 at the movable contact of the potentiometer 169.

In its first, second, and fourth positions of clock-wise movement, a switch 164 connects the collector of transistor 173 through a resistor 179 to the DC negative supply line 172. In the third position, switch 164 connects the emitter of transistor 173 to the DC negative supply line 172 through a resistor 178, to change the gain and operating point of transistor 173 to compensate for the higher operating speed of the camera.

Switches 154 and 155 changing the sensitivity of the tachometer circuit 113, switch 162 disconnecting the error signal, switch 163 changing the damping factor and connecting the reference supply source directly to the damping and inverting circuit, and switch 164 changing the operating point of the damping and inverting circuit to reduce its sensitivity are all ganged together as the speed range control of the camera.

The base of transistor 173 is connected through a resistor 181, a switch 182, and a relay 183 to DC negative supply line 172. Switch 182 serves as the starting switch for the camera. When closed, switch 182 holds the camera in an off condition by grounding the base of transistor 173 through resistor 181. Relay 183 operates in the same fashion as switch 182 to allow remote control of the on and off condition of the camera.

The damped and inverted error signal is taken from the collector terminal of transistor 173 along line 184 to the base of a PNP transistor 186 which forms part of the gate circuit 119. An NPN transistor 187 forming part of gate circuit 119 has its emitter terminal connected to the emitter of transistor 186 and receives the output of sawtooth wave generator 118 through a resistor 191 at its base.

The sawtooth wave generator circuit 118 includes a pair of transistors 188 and 189, with the collector of transistor 188 connected to the base of the transistor 189 and the base of transistor 188 connected through a resistor 197 to the full wave rectified unsmoothed output of a bridge circuit 198 in regulated DC power supply 124. Transistor 188 thus becomes conducting during the increase in amplitude on each half cycle of the alternating current supply line and ceases conduction on each half cycle as the output of bridge circuit 198 falls back toward zero. As transistor 188 becomes conducting, the drop of potential at its collector terminal drops the potential on the base terminal of transistor 189 so that transistor 189 ceases conducting, permitting a capacitor 199 to charge through a resistor 211.

When the voltage input to the base of the transistor 188 falls back toward zero and transistor 188 ceases conduction, the potential at the base terminal of transistor 189 rises correspondingly causing transistor 189 to resume conduction and drain the charge off of capacitor 199. The output of the sawtooth wave generator circuit 118 as developed at resistor 191 is therefore in the form of a sawtooth wave rising along a substantially steady slope on each half cycle of the alternating current line frequency as capacitor 199 charges, and then falling abruptly as capacitor 199 rapidly discharges through transistor 189 when transistor 189 is conducting.

Each time the amplitude of the sawtooth wave from the sawtooth wave generator circuit 118 as communicated to the base of transistor 187 exceeds the level of the damped and inverted error signal as communicated to the base of transistor 186, transistors 186 and 187 will both conduct, dropping the potential at the collector of transistor 187. This drop in potential constitutes the output signal of the gate circuit and is communicated through a resistor 192 and a capacitor 193 to the base terminal of a transistor 194 in the second trigger amplifier circuit 121. The drop in potential causes transistor 194 to become conducting, and its conduction sends a pulse of current through the primary coil of a driver transformer 196. The secondary coil of the driver transformer transmits the pulse as a trigger pulse to the silicon controlled rectifiers 212 and 213 in the motor current control circuit 122.

The motor current control circuit 122 includes a bridge circuit 218 interposed in one side of the alternating current supply line 127 leading to motor 19. The bridge circuit 218 is shunted across the middle by shunt line 217 and has silicon controlled rectifiers 212 and 213 connected in two of its legs in opposing relation to each other with their cathode terminals connected in common to shunt line 217. The remaining legs of the bridge circuit 218 are occupied by diodes 216 and 214 which are connected in opposing relation to each other with their anode terminals connected in common to shunt line 217. To complete the circuit, the cathode terminal of diode 216 is connected in common with the anode terminal of silicon controlled rectifier 212 at the input of the bridge circuit 218, and the cathode of diode 214 is connected in common with the anode of silicon controlled rectifier 213 at the output side of bridge 218.

It may be seen that with this bridge arrangement a current path exists through the bridge from the input end to the output end of the bridge for alternating current of either polarity when the silicon controlled rectifiers 212 and 213 are conducting. During the positive swing of the alternating current line, current will pass from the input of bridge 218 through silicon controlled rectifier 212 if its gate terminal has received a trigger pulse, and then through shunt line 217 and diode 214 to the output of bridge circuit 218. During the negative swing of the alternating current line, a current path exists from the input of bridge 218 through diode 216, shunt line 217, and silicon controlled rectifier 213 if its gate terminal has received a trigger pulse, and to the output of bridge circuit 218.

The gate terminals of silicon controlled rectifiers 212 and 213 are connected in common to one side of the secondary winding of the driver transformer 196 to receive the trigger pulse from transistor 194. Although both silicon controlled rectifiers receive the trigger pulse, only one of them will conduct in response to it, as only one of them will be forward-biased when the trigger pulse is received. During the positive swing of the alternating current line, silicon controlled rectifier 212 is forward-biased, and on receipt of a gate pulse will conduct, and silicon controlled rectifier 213 is reverse biased and will not conduct despite the receipt of a gate pulse. During the negative swing of the alternating current line, silicon controlled rectifier 212 is back-biased and silicon controlled rectifier 213 is forward-biased.

The lower the level of the damped and inverted error signal input to the gate circuit on line 184, the earlier in each half cycle of the alternating current line the sawtooth wave output of sawtooth wave generator 118 will exceed the amplitude of the damped and inverted error signal. The earlier the sawtooth wave amplitude exceeds the error signal amplitude, the earlier in each half cycle of the alternating current the gate circuit 119 will produce its output to the second trigger amplifier 121, which will then produce its trigger pulse to the silicon controlled rectifiers 212 and 213. The earlier in each half cycle of the alternating current line that the silicon controlled rectifiers 212 and 213 are triggered, the greater the proportion of time during that half cycle that current will be passed through the bridge circuit 218 to the motor 19. It may be seen then that a low amplitude of error signal on line 184 as a result of a great discrepancy between the setting of reference supply source 114 and the voltage output of tachometer circuit 113 which is proportional to the actual camera speed, the greater will be the current supplied to the motor 19.

A single silicon controlled rectifier 128 could be used in place of the bridge circuit 218 containing two silicon controlled rectifiers, as is illustrated in block diagram of FIG. 6. However, the use of a pair of silicon controlled rectifiers, as in bridge circuit 218, allows both halves of the alternating current cycle to be chopped for supply to the motor 19, resulting in superior speed control and improved commutation of the silicon controlled rectifiers. The commutation is improved over the use of a single silicon controlled rectifier, as during each half cycle of the alternating current, one or the other of silicon controlled rectifiers 212 and 213 is back-biased, positively ensuring its cutoff.

On the output side of bridge 218 is a full wave rectifying bridge 219 for rectifying the current supplied to motor 19. The current supplied to the motor then passes through current limiting resistors 221, 222, and 223 and on to the motor winding. A capacitor 224 shunts the current supply line to motor 19 to smooth the pulses of current supplied to the motor, thereby reducing the physical vibration and noise induced in the motor by sharp current pulses. Another capacitor 226 is connected between one side of the current supply line to motor 19 and the common point of the field and rotor winding of the motor for suppression of radio frequency interference.

The regulated DC power supply 124 includes a transformer 233 connected to the AC supply line 127 and having its secondary winding connected to the full wave rectifying bridge circuit 198. The output of bridge circuit 198 to the DC positive supply line 171 is controlled by pair of transistors 227 and 228 connected in a Darlington configuration. In line with the conventional Darlington configuration, the collector terminals of transistors 227 and 228 are connected in common to the output bridge 198 and the emitter of the transistor 227 is connected to the base of transistor 228. The emitter of transistor 228 is the outptu of the power supply to the DC positive supply line 171. The base of transistor 227 is connected to the collector of a sensing transistor 229 which responds to fluctuations in the voltage of the DC positive supply line 171 to control transistors 227 and 228. A voltage reference level is established at the emitter of transistor 229 by a Zener diode 231. The base of transistor 229 is connected to line 171 through a resistor 232 so that excesses in the voltage in line 171 above the desired level will be reflected in an increase in the conduction of transistor 229, which will result in turn in a current flow away from the base of transistor 227 through transistor 229 and Zener diode 231 to negative supply line 172. This outflow of current from the base of transistor 227 will tend to decrease its conduction of current and thereby also the conduction of current by transistor 228. The voltage level output at the collector of transistor 228 will therefore drop correspondingly to correct the excessive voltage in line 171. Upon a deficiency in the voltage in line 171, less current will flow out of the base of transistor 227 through transistor 229 as transistor 229 will have become less conducting. With the decrease in current flow away from the base of transistor 227, transistors 227 and 228 will increase their conduction to thereby increase the voltage level at the collector of transistor 228, overcoming the deficiency in line 171. The Darlington configuration of transistors 227 and 228 is used here for its superior sensitivity and its high input impedance.

The negative output terminal of bridge 198 is coupled with the negative supply line 172 through a current limiting transistor 234. Transistor 234 is biased to be normally saturated or conducting upon the drawing of up to a certain fixed limit of current through it. An emitter resistor 236 and a base bias resistor 237 set the bias on transistor 234 such that if its current output were shorted a current of approximately 150 milliamperes would flow through it. On the drawing of that amount of current through transistor 234, the voltage drop across resistor 236 will exceed the voltage drop across a Zener diode 238 connected to the base of transistor 234 and transistor 234 will therefore be biased to pass 150 milliamperes of current maximum. When the short circuit is removed, normal operation is resumed.

From the foregoing, it may be seen that the film speed control apparatus of the present invention increases the steadiness of the image position on the film by decoupling the portion of the film passing through the gate of the camera from mechanical and electrical influences tending to cause undesirable changes in the speed of movement. The decoupling is provided by electronic circuitry which quickly senses camera speed and regulates the duration of current flow to the motor accordingly, and by mechanical decouplers which physically isolate a tensioned loop of film passing through the film gate from intermittent forces such as jerking, vibrating, sticking and slipping in the takeup and supply spools.

I claim:

1. A high speed motion picture camera, comprising a housing, a film drive means for passing a film strip through said camera, said film drive means comprising a spindle formed for supporting a motion picture film feed spool, a take-up spindle adapted for supporting a motion picture film take-up spool, a motor connected in driving relation to said take-up spindle, a film gate mounted in said housing and formed for supporting film passed therethrough by said drive means in a substantially flat plane, a film engaging sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, optical means including an objective lens system and a system of reflective surfaces supported within said housing in position to intercept the beam of light entering the camera through the objective lens system and to direct said beam of light through said prism and onto the film in said film gate, and decoupling means isolating the portion of the film strip moving through said film gate from speed varying effects of transient changes in power supply to said motor and from mechanical influences tending to vary film speed from a selected rate.

2. A high speed motion picture camera as described in claim 1, and wherein said camera is supplied with power from an AC power supply line and said decoupling means incorporates an electronic speed control circuit in the power supply to said motor, comprising a speed sensing circuit responsive to operation of the camera to produce a series of pulses whose repetition frequency varies in proportion with the speed the film strip moves through said film gate, a tachometer circuit responsive to said pulses for producing a DC signal level proportional to the repetition frequency of said pulses, a reference source for producing a manually adjustable DC signal level, a differential amplifier circuit responsive to the DC signal level from said tachometer circuit and the DC signal level from said reference source to produce an error signal proportional to the difference between said DC signals, a sawtooth wave generator circuit adapted to produce a sawtooth wave in synchronism with each half cycle of the AC line, a gate circuit responsive to said error signal and said sawtooth wave for producing an output signal during the time the amplitude of said sawtooth wave exceeds the level of said error signal, a motor current control circuit interposed in the AC supply line to said motor, said motor current control circuit comprising a silicon controlled rectifier connected in said AC supply line, the gate terminal of said silicon controlled rectifier being coupled to said gate circuit for receiving the output signal therefrom to activate said silicon controlled rectifier to pass current to said motor, and switch means for disconnecting the error signal output of said differential amplifier circuit from said gate circuit and connecting the manually adjustable DC signal level from said reference source to said gate circuit in its place to produce a manually adjustable signal to the gate terminal of said silicon controlled rectifier independent of the speed of the motor.

3. A high speed motion picture camera as described in claim 2, wherein a first trigger amplifier circuit is interposed between the output of said speed sensing circuit and the input of said tachometer circuit responsive to said pulses for amplifying and shaping same, said tachometer circuit being responsive to said amplified and shaped pulses, a damping circuit is interposed between the output of said differential amplifier circuit and the input of said gate circuit for damping said error signal to match the electrical response time of the speed control circuit to the mechanical response time of the motor and camera and prevent overshoot and oscillation in the speed control circuit, a second trigger amplifier circuit is interposed between the output of said gate circuit and the gate terminal of said silicon controlled rectifier for producing a trigger pulse upon initiation of said output signal from said gate circuit, and said motor current control circuit includes a bridge circuit interposed in the AC supply line to said motor, said bridge circuit being shunted across the middle and having silicon controlled rectifiers in two of the four legs thereof, the remaining two legs of said bridge circuit containing diodes, said silicon controlled rectifiers being connected in opposing relation to each other and having their cathode terminals connected in common and their gate terminals connected in common, said diodes being connected in opposing relation to each other and having their anode terminals connected in common, whereby a current path for current of either polarity exists through said bridge upon triggering of both of the silicon controlled rectifiers and one of said silicon controlled rectifiers and one of said diodes will be back-biased on each half cycle of the AC supply line, the gate terminals of each of said silicon controlled rectifiers being coupled to said second trigger amplifier circuit for receiving said trigger pulse to activate the silicon controlled rectifiers.

4. A high speed motion picture camera as described in claim 1, and wherein said decoupling means includes decoupling apparatus, comprising a toothed decoupler sprocket disposed along the path of the strip of film between said spools and said gate and engaging the film at two points along said path, one point being between the supply spool and the gate and the other point being between the gate and the take-up spool.

5. A high speed motion picture camera as described in claim 4 and wherein said decoupling apparatus includes a first decoupler device located along the film path between the supply reel and said sprocket and formed for applying a component of force against the film surface perpendicular to the direction of movement of the film, and a second decoupler device located along the film path between said sprocket and the take-up reel and formed for applying a second component of force against the film surface perpendicular to the direction of movement of the film, whereby transient unwanted modulations in the speed of movement of the film will be mechanically filtered out by said decoupler means.

6. A high speed motion picture camera as described in claim 5, and wherein said decoupling means includes an electronic speed control circuit comprising a speed sensing circuit responsive to operation of the camera to produce a series of pulses whose repetition frequency varies in proportion with the speed the film strip moves through said film gate, a tachometer circuit responsive to said pulses for producing a DC signal level proportional to the repetition frequency of said pulses, a reference source for producing a manually adjustable DC signal level, a differential amplifier circuit responsive to the DC signal level from said tachometer circuit and the DC signal level from said reference source to produce an error signal proportional to the difference between said DC signals, a sawtooth wave generator circuit adapted to produce a sawtooth wave in synchronism with each half cycle of the AC line, a gate circuit responsive to said error signal and said sawtooth wave for producing an output signal during the time the amplitude of said sawtooth wave exceeds the level of said error signal, a motor current control circuit interposed in the AC supply line to said motor, said motor current control circuit comprising a silicon controlled rectifier connected in said AC supply line, the gate terminal of said silicon controlled rectifier being coupled to said gate circuit for receiving the output signal therefrom to activate said silicon controlled rectifier to pass current to said motor, and switch means for disconnecting the error signal output of said differential amplifier circuit from said gate circuit and connecting the manually adjustable DC signal level from said reference source to said gate circuit in its place to produce a manually adjustable signal to the gate terminal of said silicon controlled rectifier independent of the speed of the motor.

7. A high speed motion picture camera as described in claim 1, and wherein said decoupling means includes decoupling appartus, comprising a first decoupler device located along the film path between the supply spool and the gate and formed for resiliently applying a component of force against the film surface perpendicular to the direction of movement of the film, and a second decoupler device located along the film path between the gate and the take-up spool and formed for resiliently applying a component of force against the film surface perpendicular to the direction of movement of the film whereby transient unwanted modulations in the speed of movement of the film will be mechanically filtered out by said decoupler apparatus.

8. In a high speed motion picture camera of the continuous motion type having film supply and film take-up spools and a gate through which a strip of film moves for exposure, a toothed decoupler sprocket disposed along the path of the strip of film between said spools and said gate and engaging the film at two points along said path to define a film loop extending from one of said points to the other and passing through the gate, one of said points being between the supply spool and the gate and the other of said points being between the gate and the take-up spool said film loop being tensioned so that no slack exists in the film loop.

9. In a continuous motion high speed motion picture camera, the combination as described in claim 8, and wherein said decoupler sprocket is undriven and the length of the path of said film strip from said sprocket through the gate and back to the sprocket is an integral multiple of the spacing of the sprocket holes in the strip of film, whereby the film will be held under constant tension over the path from said sprocket through the gate and back to said sprocket again.

10. In a continuous motion high speed motion picture camera, the combination as described in claim 9 and wherein said decoupler sprocket is freewheeling.

11. In a continuous motion high speed motion picture camera, the combination as described in claim 8 and wherein said camera includes a first decoupler device located along the film path between the supply reel and said sprocket and applying a component of force against the film surface perpendicular to the direction of movement of the film and a second decoupler device located along the film path between said sprocket and the take-up reel and applying a component of force against the film surface perpendicularly to the direction of movement of the film, whereby transient unwanted modulations in the speed of movement of the film will be mechanically filtered out by said decoupler means.

12. An electronic speed control circuit for controlling the speed of a continuous motion film motion picture camera supplied from an AC supply line, comprising
a motor for driving the camera,
a speed sensing circuit responsive to operation of the camera to produce a series of pulses whose repetition frequency varies in proportion with the speed of said camera,
a tachometer circuit responsive to said pulses for producing a DC signal level proportional to the repetition frequency of said pulses,
a reference source for producing a manually adjustable DC signal level,
a differential amplifier circuit responsive to the DC signal level form said tachometer circuit and the DC signal level from said reference source to produce an error signal proportional to the difference between said DC signals,
a sawtooth wave generator circuit adapted to produce a sawtooth wave in synchronism with each half cycle of the AC line,
a gate circuit responsive to said error signal and said sawtooth wave for producing an output signal during the time the amplitude of said sawtooth wave exceeds the level of said error signal,
a motor current control circuit interposed in the AC supply line to said motor, said motor current control circuit comprising a silicon controlled rectifier connected in said AC supply line, the gate terminal of said silicon controlled rectifier being coupled to said gate circuit for receiving the output signal therefrom to activate said silicon controlled rectifier to pass current to said motor, and
switch means for disconnecting the error signal output of said differential amplifier circuit from said gate circuit and connecting the manually adjustable DC signal level from said reference source to said gate circuit in its place to produce a manually adjustable signal to the gate terminal of said silicon controlled rectifier independent of the speed of the motor.

13. An electronic speed control circuit as described in claim 12 and wherein
a first trigger amplifier circuit is interposed between the output of said speed sensing circuit and the input of said tachometer circuit responsive to said pulses for amplifying and shaping same, said tachometer circuit being responsive to said amplified and shaped pulses,
a damping circuit is interposed between the output of said differential amplifier circuit and the input of said gate circuit for damping said error signal to match the electrical response time of the speed control system to the mechanical response time of the motor and camera and prevent overshoot and oscillation in the speed control system,
a second trigger amplifier circuit is interposed between the output of said gate circuit and the gate terminal of said silicon controlled rectifier for producing a trigger pulse upon initiation of said output signal from said gate circuit, and
said motor current control circuit includes a bridge circuit interposed in the AC supply line to said motor, said bridge circuit being shunted across the middle and having silicon controlled rectifiers in two of the four legs thereof, the remaining two legs of said bridge containing diodes, said silicon controlled rectifiers being connected in opposing relation to each other and having their cathode terminals connected in common and their gate terminals connected in common, said diodes being connected in opposing relation to each other and having their anode terminals connected in common, whereby a current path for current of either polarity exists through said bridge upon triggering of both of the silicon controlled rectifiers and one of said silicon controlled rectifiers and one of said diodes will be back-biased on each half cycle of the AC supply line, the gate terminals of each of said silicon controlled rectifiers being coupled to said second trigger amplifier circuit for receiving said trigger pulse to activate the silicon controlled rectifiers.

References Cited
UNITED STATES PATENTS 2,631,492 3/1953 Calvin ______________ 352—184
2,676,023 4/1954 Isom.
2,685,417 8/1954 Bartelson.

JULIA E. COINER, Primary Examiner

U.S. Cl. X.R.

352—29, 30, 119